United States Patent [19]

Gibbemeyer

[11] Patent Number: 4,767,311
[45] Date of Patent: Aug. 30, 1988

[54] BLOW MOLDING APPARATUS WITH RESILIENT SKIRTED SPINDLE NOSE

[75] Inventor: Joseph F. Gibbemeyer, Cincinnati, Ohio

[73] Assignee: Cincinnati Milacron Inc., Cincinnati, Ohio

[21] Appl. No.: 70,000

[22] Filed: Jul. 6, 1987

Related U.S. Application Data

[63] Continuation-in-part of Ser. No. 869,499, Jun. 2, 1986, Pat. No. 4,723,906, and a continuation-in-part of Ser. No. 900,947, Aug. 27, 1986, Pat. No. 4,678,425.

[51] Int. Cl.[4] .................. B29C 49/28; B29C 49/38
[52] U.S. Cl. ............................. 425/526; 198/803.8; 425/534; 425/537
[58] Field of Search ............... 425/534, 522, 534, 535, 425/525, 528, 538, 539, 526, 536, 539, 582; 198/470.1, 803.12, 803.8, 803.5, 803.7

[56] References Cited

U.S. PATENT DOCUMENTS

| | | | |
|---|---|---|---|
| 2,096,264 | 10/1937 | Schutz | 198/803.8 |
| 3,186,028 | 6/1965 | Dobbins et al. | 425/526 |
| 3,321,564 | 5/1967 | Dobbins et al. | 425/534 |
| 4,070,428 | 1/1978 | Krall et al. | 425/534 |
| 4,082,175 | 4/1978 | Gibbemeyer | 198/803.12 |
| 4,086,999 | 5/1978 | McDonald | 198/803.12 |
| 4,199,183 | 4/1980 | Hecker | 198/803.12 |
| 4,313,720 | 2/1982 | Spurr | 425/534 |
| 4,317,793 | 3/1982 | Hubert et al. | 425/534 |
| 4,362,498 | 12/1982 | Harry et al. | 425/538 |
| 4,382,260 | 5/1983 | Wiatt et al. | 425/538 |
| 4,382,760 | 5/1983 | Wiatt et al. | 425/526 |
| 4,391,578 | 7/1983 | Schaar et al. | 425/525 |
| 4,409,161 | 10/1983 | Harry et al. | 425/526 |
| 4,435,146 | 3/1984 | Wiatt et al. | 425/534 |
| 4,456,447 | 6/1984 | Smith | 425/534 |
| 4,484,884 | 11/1984 | Wiatt et al. | 425/534 |
| 4,498,859 | 2/1985 | Gibbemeyer | 198/803.12 |

FOREIGN PATENT DOCUMENTS 1196858  7/1970  United Kingdom ........... 198/803.12

Primary Examiner—Willard Hoag
Attorney, Agent, or Firm—C. Richard Eby; Daniel P. Worth

[57]                    ABSTRACT

A reheat blow molding machine having an article handling system that carries heated preforms by a carriage assembly from an oven to a chain conveyor which moves them to a blow mold from whence the blown product is moved to an eject station. Attached to the chain conveyor are preform holder assemblies each of which contains a resilient spindle nose which supports the preforms by engaging an internal surface at one end of the preform.

8 Claims, 11 Drawing Sheets

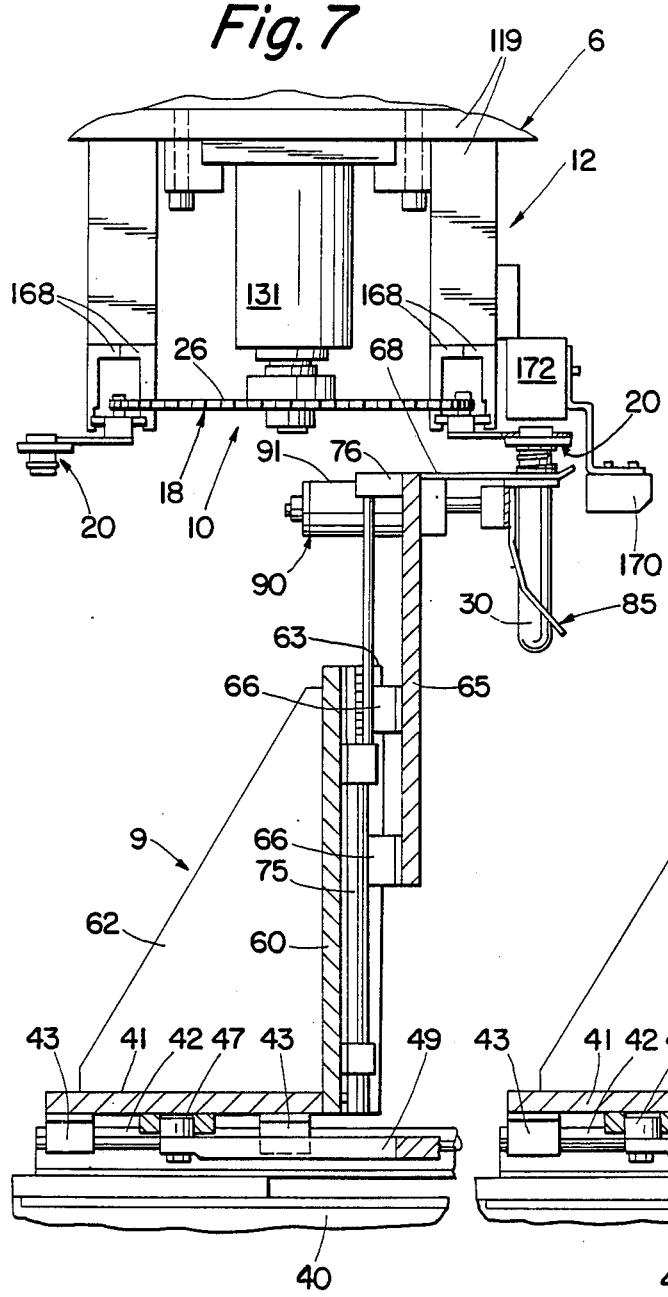
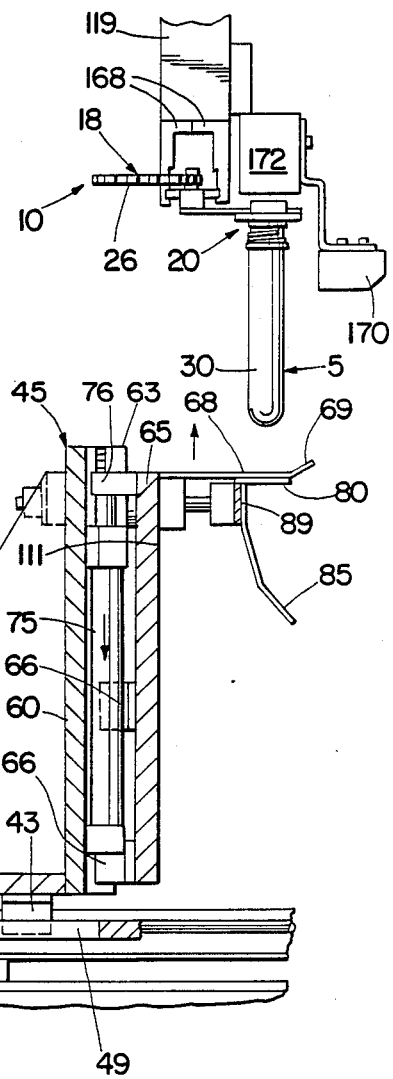

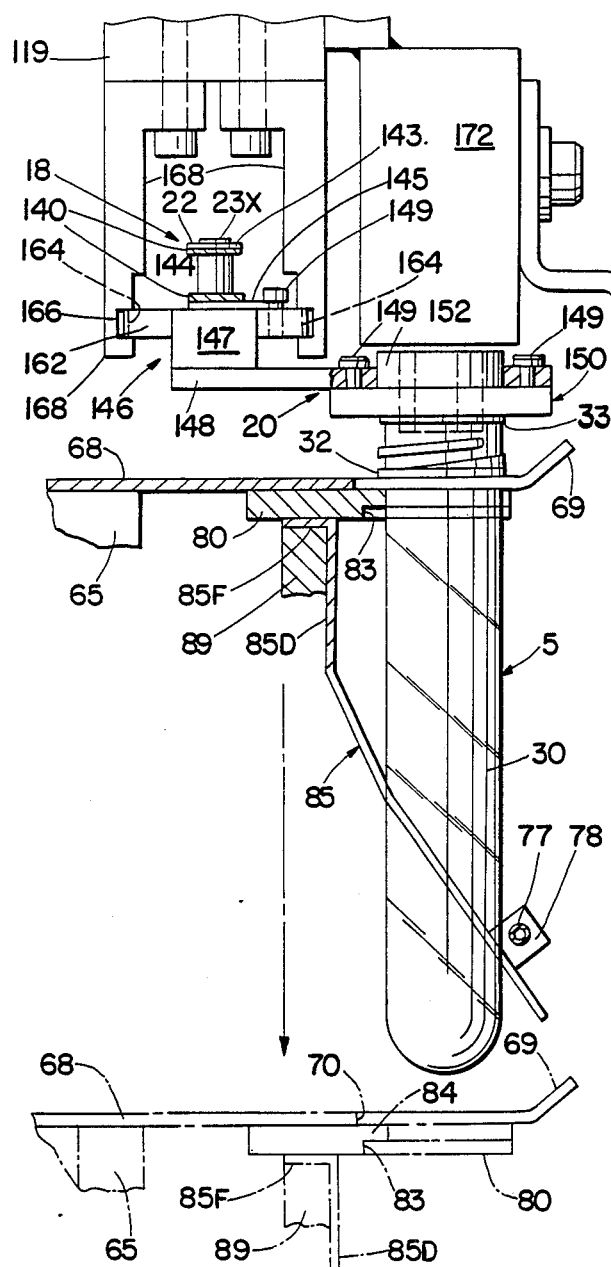
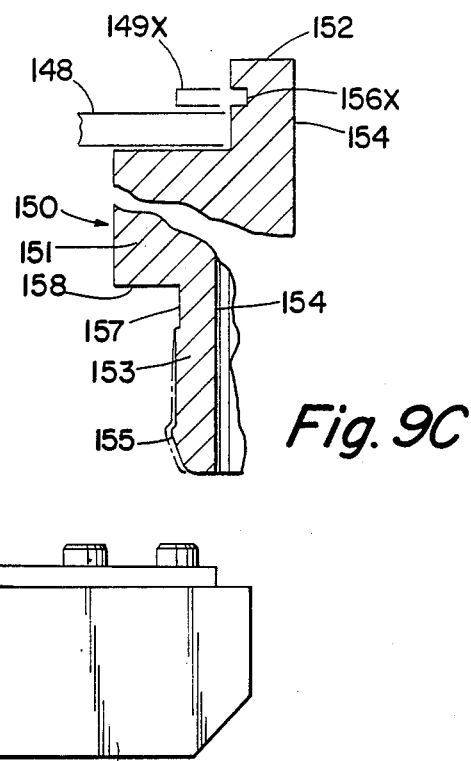
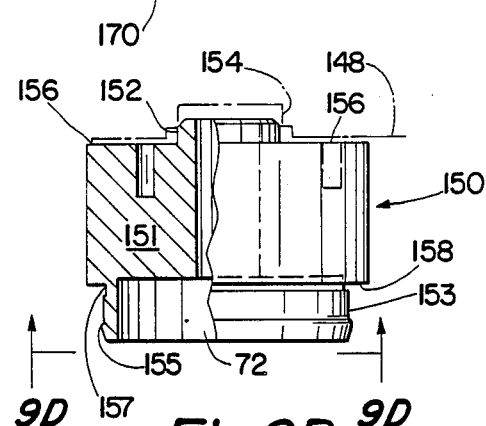
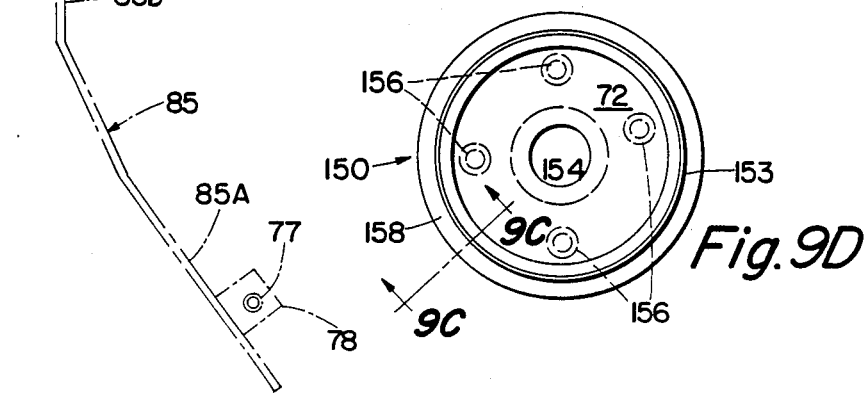

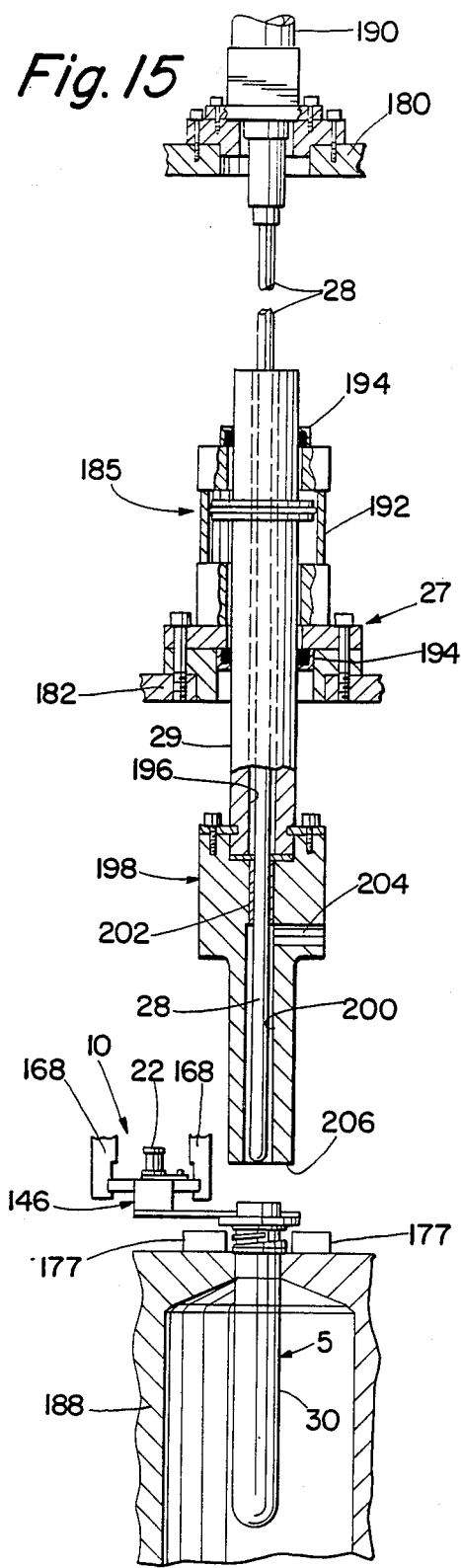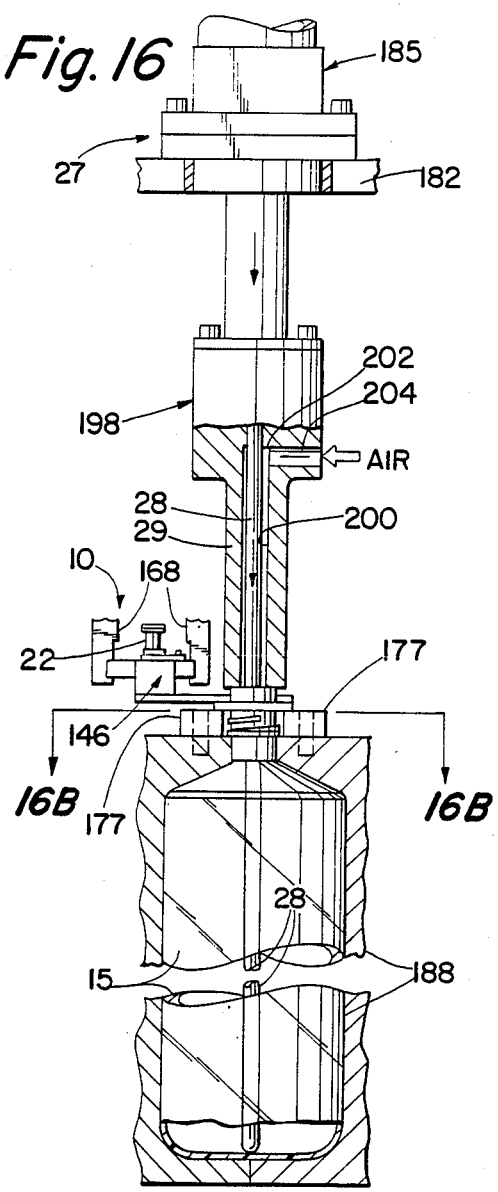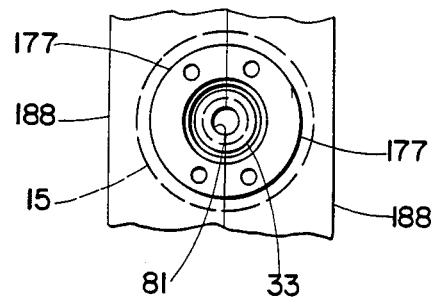

BLOW MOLDING APPARATUS WITH RESILIENT SKIRTED SPINDLE NOSE

This application is a continuation-in-part of two earlier applications, Ser. No. 869,499 filed June 2, 1986 which issued as U.S. Pat. No. 4,723,906 on Feb. 9, 1988 and, Ser. No. 900,947 filed Aug. 27, 1986 which issued as U.S. Pat. No. 4,678,425 on July 7, 1987.

The present invention relates to an improvement in plastic blow molding apparatus. One aspect is a conveyor system for handling an elongated article—or plurality thereof—that depend from a part of the system. One aspect is an improvement in a preform handling system for a reheat blow molding apparatus to move one or more injection molded plastic resin preforms from an oven to a blow mold and to remove the blown product from the blow mold in connection with which the invention will be described without intending to be limited thereto.

Blow molding is used in the art of manufacturing hollow articles such as bottles and jars from various plastics and resins such as polyethylene, polyvinyl chloride, polyacrylonitrile, polyethylene terephthalate and the like.

In reheat blow molding, the plastic is first injection molded to make a preform. Later on, in a separate operation, the preform is reheated to a suitable temperature and is then blown into a product. The temperature is selected to provide biaxial orientation of the end product, commonly a soft drink bottle. Where the end product is to be, for example, a bottle with a threaded neck, the injection molding yields the advantages of reducing thermal memory problems and providing a threaded neck which will not change significantly in shape or dimension during further processing.

The present invention is adapted to handle an article for blow molding in the form of an injection molded hollow preform of such resin which in turn is shaped like a test tube and which may have a plain open end or finish but may have a ring and/or male threads about its open end or finish. As in past practice, the body of the preform is usually heated to an orienting temperature but the threaded end (finish) has been kept cool, unheated because such end is not to be blown. In the parent applications such a preform usually had a tamperproof ring at the bottom of the threads and a stacking ring (sometimes called capping ring) underneath the tamperproof ring: the axial space between such rings typically defined a groove and was preferably the portion of the preform engaged by the conveyor of those inventions.

The present invention differs from its parent Ser. No. 869,499 by using the resilient skirted spindle nose or internal mandrel of the other parent Ser. No. 900,947 to engage a preform on the inside of the finish instead of having a groove as aforesaid.

An object of this invention is to provide a means to convey a preform through an entire blow molding operation, especially through a blow molding station wherein the preform is engaged and carried by other than the said groove. An advantage is the ability to handle a preform with a different finish, usually one to make a container intended for a different use (e.g. as a container for soap, noncarbonated beverage, liquid seasoning, and wide mouth container such as for peanut butter or pickles), hence having lighter weight and a different finish which result from less exacting or different requirements or demands by the contents.

Blow molding apparatus of the sort to which the present invention is preferably applied and of which it is an improvement is the Cincinnati Milacron RHB-V heat blow molding machine which has been in use for well over a decade. Such machine (or components) is described in a number of United States patents, among them U.S. Pat. Nos. 3,958,685; 4,082,175; (both teaching couplings, conveyors suitable for ovens and ovens) and 4,185,812 (blow molding pallet for use at a blow mold work station) which are expressly incorporated by reference herein.

The system of the present invention, while generally applicable to article handling, is preferably adapted to blow molding, most preferably is intended to replace the pallet assembly described in U.S. Pat. No. 4,185,812.

An object of the present invention is provision of an improved means for transporting a workpiece from a first station where received through a number of stations. Another object of the present invention is provision of an improved conveyor system for handling one or more elongated depending workpieces. An object of the invention is to provide a handling system for a reheat blow molding apparatus to move one or more injection molded plastic resin preforms from an oven to a blow mold and to remove the blown product from the blow mold.

The invention also includes a reheat blow molding apparatus to move a heated preform from an oven to a blow mold where it is blown into a hollow product using a stuffer assembly and to convey such product to an eject station wherein the preform has an unblown finish engaged by an internal mandrel of the apparatus from which depends a hollow tubular body that is blown to form the product and which does not require or use a groove for handling, although this invention can handle a preform with said groove. Further, the invention comprehends a blow molding machine with an oven section; a blow mold section for blow molding the preform into a hollow product and ejecting such product from the machine; a preform transfer station, a blow station, a blow mold at said blow station, and a product eject station disposed along one side of said blow section; a carriage means for receiving a preform from the oven and moving same to the preform transfer station; an endless conveyor drive member (such as a roller chain) in said blow mold section disposed in a horizontal plane (with the pins vertical if a chain) and with a path of movement or run extending along said blow section one side; a plurality of internal mandrels as downward facing preform holder means (each to engage the inside of a preform finish spaced at a predetermined interval from each other along said conveyor such that a holder means is at each of said stations at the same time; and said carriage means being built generally as in one of the parent cases but operating in a different mode so as to vertically deliver the preforms to the holder means prior to loading at the oven.

One aspect of the invention relates to conveyor apparatus for conveying a plurality of preforms from a transfer or loading station through a blowing station where each preform is received in a blow mold and converted to an expanded hollow product therein, and then to an eject station where such product is ejected, which apparatus includes a roller chain disposed in a horizontal plane with its pins vertical and about sprockets; a plurality of groups of preform holder assemblies arranged in succession on said chain, the preform holder assemblies in each group each including a resilient skirted spindle nose or internal mandrel and being spaced the same as the blow molds are spaced so the preforms may be presented aligned with respective blow molds; and an intermittent drive means to periodically move the chain an amount to remove an entire group of holder assemblies (with—when operating—products from said blow molds) to the eject station and to replace same with the next succeeding group of holders. Another aspect is such a conveyor wherein each nose or holder assembly has a member of low friction plastic to engage the inside of the finish and supported at its upper end from a support that extends outwardly from the chain with the outer end extending outboard of the chain pitch line; and a holder means on the support member outer end having an insertable or mandrel skirted part of low friction plastic or at least with a part engaging surface of low friction material to engage internally and snugly fit the preform finish, such skirted part being located to dispose the preform in alignment with its respective blow mold; and stop means to assist in achieving good seating of mandrel to part to associated equipment, e.g. for transfer, blowing, or eject, thus to keep predetermined location.

The present invention also includes a novel mode of operating the reach and take or carriage assembly of the parent case to enable the different cooperation required for vertical feeding of a preform into engagement with the novel spindle nose.

The present invention also includes respective improvements at the other stations, the stuffer and ejector to cooperate with the spindle nose as vertically supported from the chain. The instant blow station establishes a bearing relation with the spindle nose, not the preform. The instant ejector pulls the product straight down off the nose while supporting the chain against undue vertical flexure.

Other objects advantages and features will become apparent from the following detailed disclosure when read in conjunction with the annexed drawings.

BRIEF DESCRIPTION OF THE DRAWINGS

FIGS. 7 and 8 are side elevation views on section 7—7 of the FIG. 1 carrier assembly at the transfer station at the time of preform transfer vertically up into the blow mold conveyor and immediately after, respectively, depicting positions at the time of transfer and after transfer in the position for returning to the over load of FIG. 2;

FIGS. 9A-9D are an enlarged view of a part of FIG. 7 showing relationship at the transfer station of preform, outer plate of the carrier, holder assembly, and details of the latter;

FIG. 15 is a partial section side elevation along 15—15 of FIG. 1 showing the telescoping relation of the stuffer and center rods and alignment therewith of holder assembly with nose, preform, and blow mold;

FIG. 16 is an enlarged view of parts of FIG. 15 showing the bearing engagement between the blow mold stops and the spindle nose;

FIG. 16B is a view along 16B—16B of FIG. 16 illustrating the semicircular blow stops;

Figure 1:
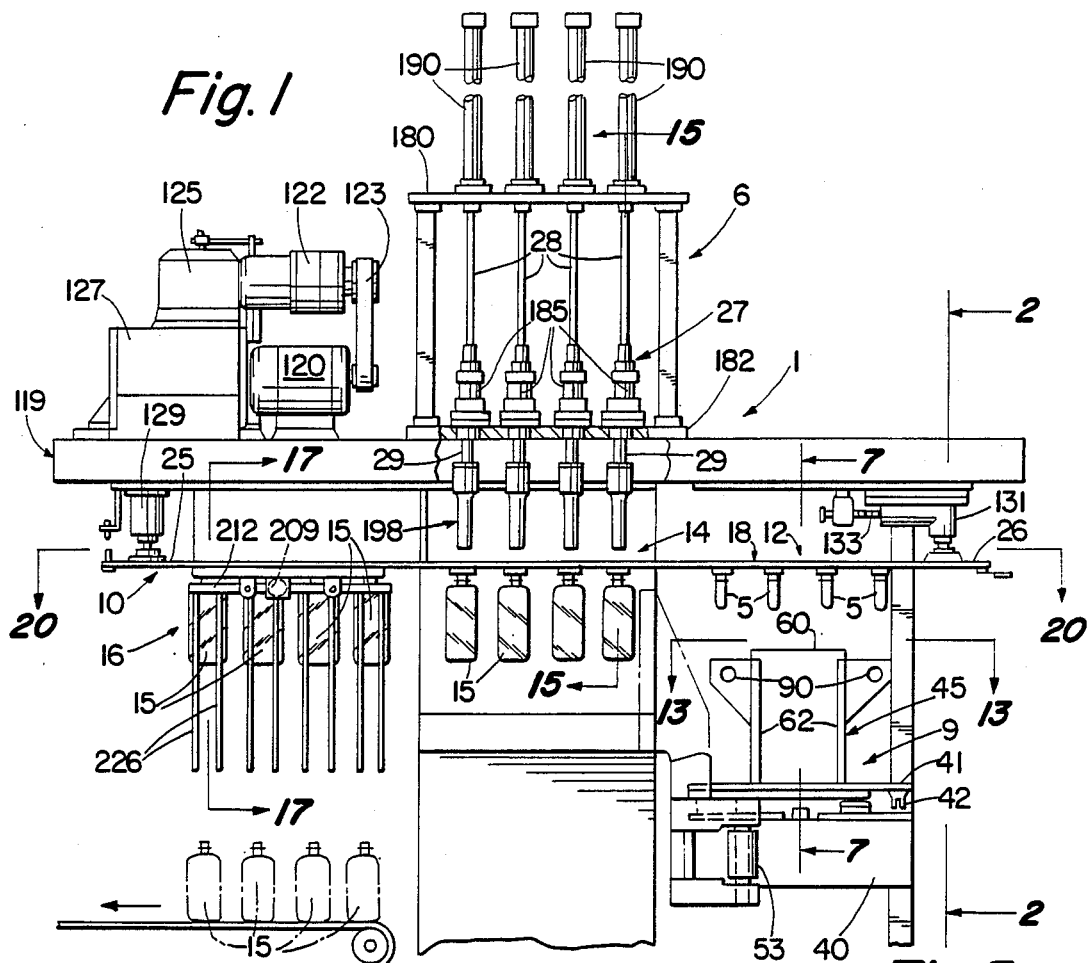
FIG. 1 is a partially cutaway front elevation of a reheat blow molding machine equipped with the invention and generally depicting the oven discharge and blow molding portion of the machine.
Figures 3, 4:
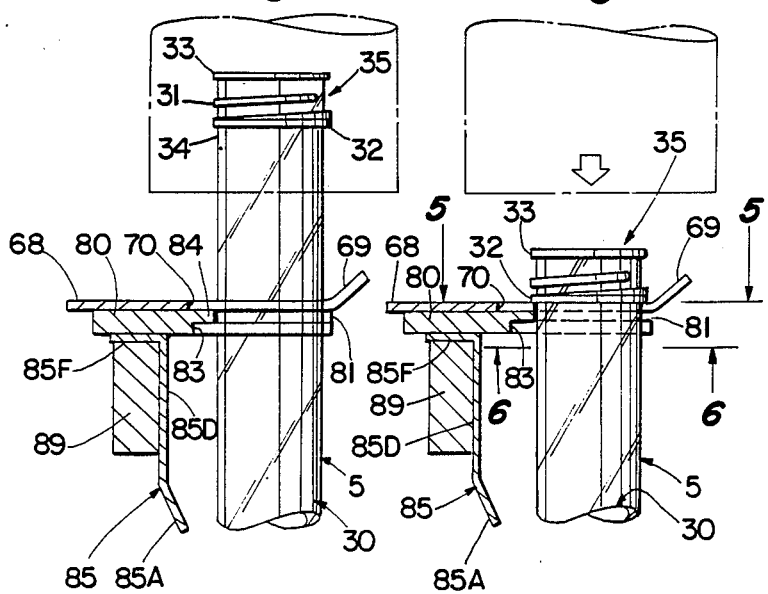
FIGS. 3 and 4 are enlarged side elevation views showing successive positions of the carriage assembly (reach and take assembly) outer or top plate, preform with a non-grooved finish, and oven coupling during preform reception at the oven discharge (discharge shown with ghost or dotted lines)

Throughout the following description the same reference numbers are used to refer to same parts. As already stated above, the description is made by way of reference to the preferred application of the present invention to handling a preform in an RHB-V blow molding system, it being understood that other applications of similar shaped articles are within the spirit of this present invention. The present invention also is described and illustrated for the handling of our articles at a time, it being understood that a different quantity can be handled simultaneously and that the description usually refers to the handling of only one for the sake of simplicity, not by way of limitation.

GENERAL DESCRIPTION FIGS. 1, 2, 20)

The purpose of the blow molding conveyor 1 of the present invention is to receive a preform 5 when ejected from an oven 7 in which it has been heated and to transport it through a series of operations which include blow molding it into a bottle and ejecting it from the blow molding machine 6. To do this, oven 7 ejects preform 5 vertically downward into a carriage assembly (reach and take) means 9. The carriage assembly means moves the preform to where it is engaged by a conveyor system 10 at a transfer station 12. The conveyor system has three work stations through which it moves the preform: the aforementioned transfer station 12, a blow molding station 14 where preform 5 is blow molded into a product 15, normally a bottle, and then an eject station 16 where product 15 is removed from the machine environment. The conveyor system preferably comprises an endless conveyor member 18 having one or more holder means 20 protruding outwardly therefrom. The preform 5 is transferred from carriage assembly 9 at the transfer station 12 into one of the holders 20 and stays engaged from the work station through the blow molding and eject operations and stations.

Figure 20:
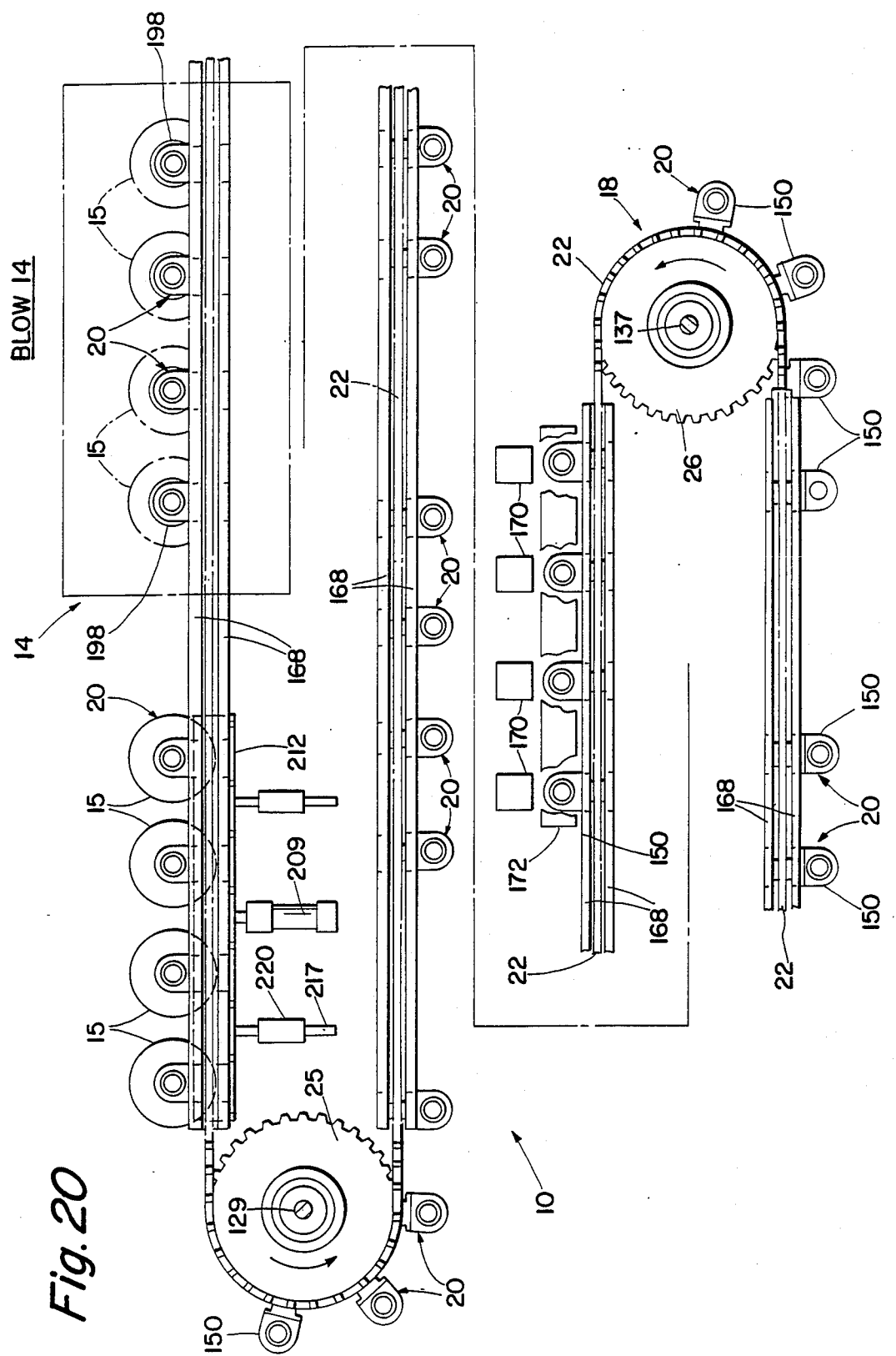
FIG. 20 is a top plan view of the roller chain along 20—20 of FIG. 1 depicting, inter alia, stop blocks 172 (dotted lines) and blow stops 177 at the carriage-conveyor transfer and blow stations, respectively.

Preferably endless conveyor member 18, which interacts with carriage 9, comprises a roller chain 22 disposed with its pins 23 (FIG. 9A) vertical and around sprockets 25, 26 (FIG. 20) which turn about vertical axes.

The invention also includes an improved bearing or stop block 177 at the blow station having a vertical force resisting coaction with a flange on the spindle nose part of holder 20 thereby to keep vertical loading off of the preform per se and between machine parts. Further, the invention includes a unique aspect of the ejection apparatus which ejects the preform along a vertical axis by pulling it vertically down off the holder or spindle nose.

THE PREFORM (FIGS. 2–6, 9 AND 16

Figure 2:
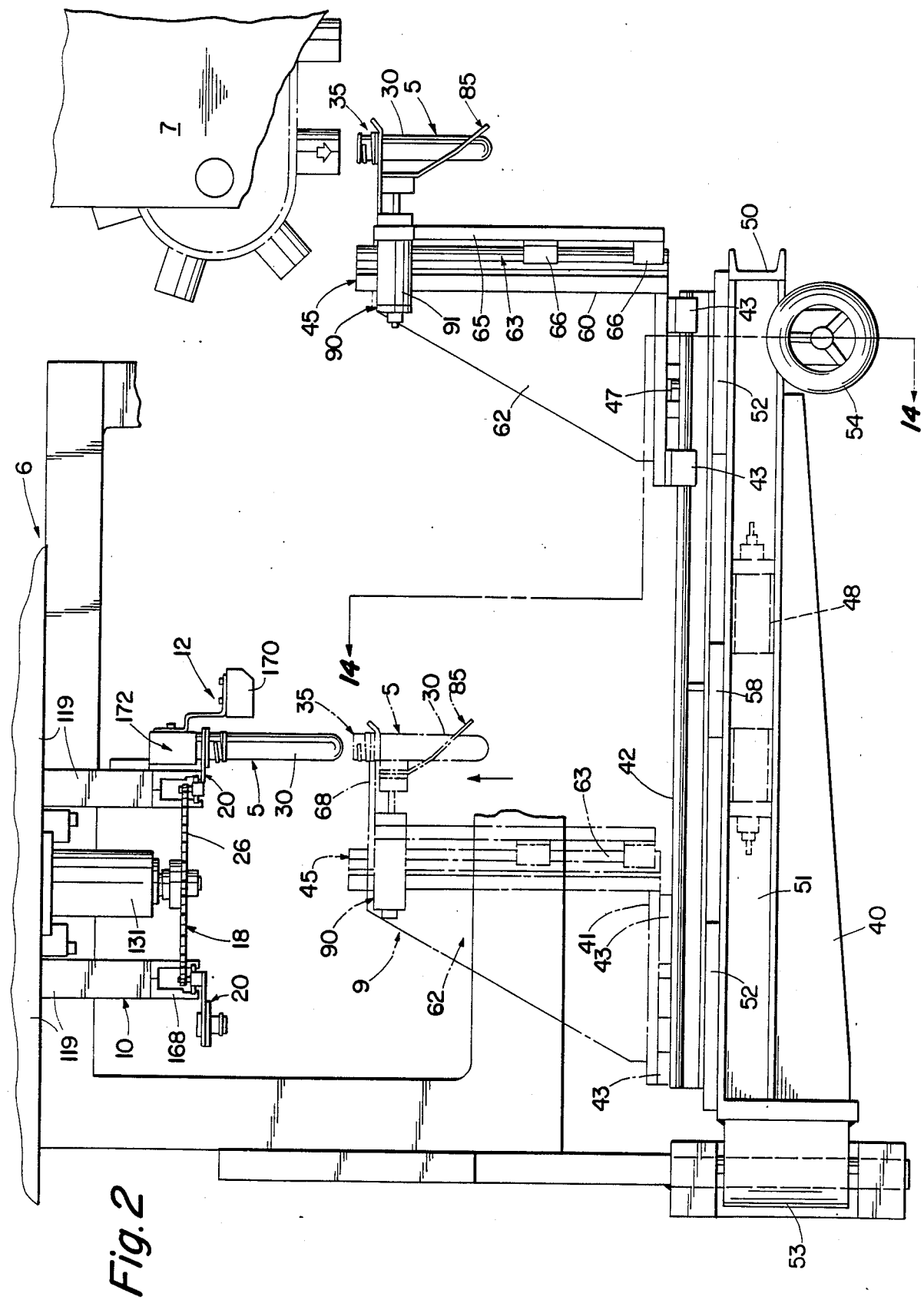
FIG. 2 is a side elevation as from 2—2 of FIG. 1.

Preform 5 (FIG. 2) is usually of injection molded thermoplastic biaxially orientable material which will so orient upon being blown in a mold under certain conditions, including preform temperature. For example, polyethylene terephthalate orients in the range from about 200° F. to 250° F. Exemplar preform 5 has a hollow body 30 of circular cross-section, shaped like a test tube with a finish 35 having an external thread 31 above a ring 32 and with a lip or flange 33 at its extreme outer, open end. That is, preform 5 for the example herein does not have to have a groove as in its parent cases but should have a finish with some part larger than the preform body.

Figure 6:
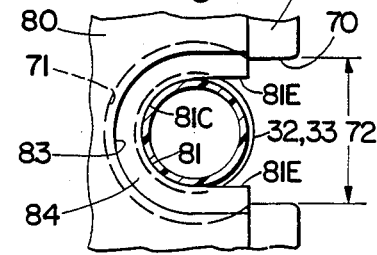
FIG. 6 is a section on 6—6 of FIG. 4.

Preform 5 is not blow molded in the region of the finish 35 hence is not heated in such region by the oven. For this reason the preform is handled (e.g. FIG. 2) and engaged (FIG. 6) herein by inserting the nose into the preform finish 35 until the blow molding has been accomplished.

The biaxially orientable material is commonly and preferably polyethylene terephthalate in amorphous form (PET) but may also comprise other biaxially orientable resin. Preform structure, materials, etc. are described generally in the above mentioned U.S. Patents, applications, and elsewhere to all of which the reader is referred for additional preform information.

REACH AND TAKE OR CARRIAGE ASSEMBLY MEANS 9 (FIGS. 1, 2, 7, 8, 11–14)

The reach and take assembly 9 comprises on frame 40 a horizontal carriage base 41 supported on guide rails 42 by means of linear bearings 43 to move back and forth between oven 7 and transfer station 12 of the conveyor system. A vertical carriage assembly 45 is also mounted on carriage base 41 and is constructed to move at proper times from a low preform-receiving elevation (FIGS. 2, 8) underneath oven 7 to a greater elevation (FIG. 7) where the preform is pushed up to the correct height for receipt and engagement by conveyor system 10 at transfer station 12. There is also an abort or fail safe means 46A associated with vertical assembly carriage 45 to insure that no preform remains in carriage assembly 9 at the time it is moved underneath the oven.

A rotary actuator 48 is secured to frame 40 underneath horizontal carriage 41 which it engages by sort of scotch yoke 49 to cause the back and forth motion of the overall carriage assembly or reach and take. Scotch yoke 49 includes two spaced apart rails secured underneath base 41 and within the resulting groove moves a pin or preferably cam follower 47 (FIGS. 7, 8) on the actuator crank arm. The rotary actuator is preferably a hydraulic cylinder designed to provide 180° of crank operation and then to reset and is commercially available.

As should be appreciated from the drawings, four preforms 5 are handled at a time, that being the quantity received simultaneously from oven 7. However, since their handling is identical in each lane, the description is given for one preform only, it being understood that the system is capable of conveying a plurality of them from the time they are received from oven 7 to the time they are ejected from the conveyor system at station 16.

Figure 14:
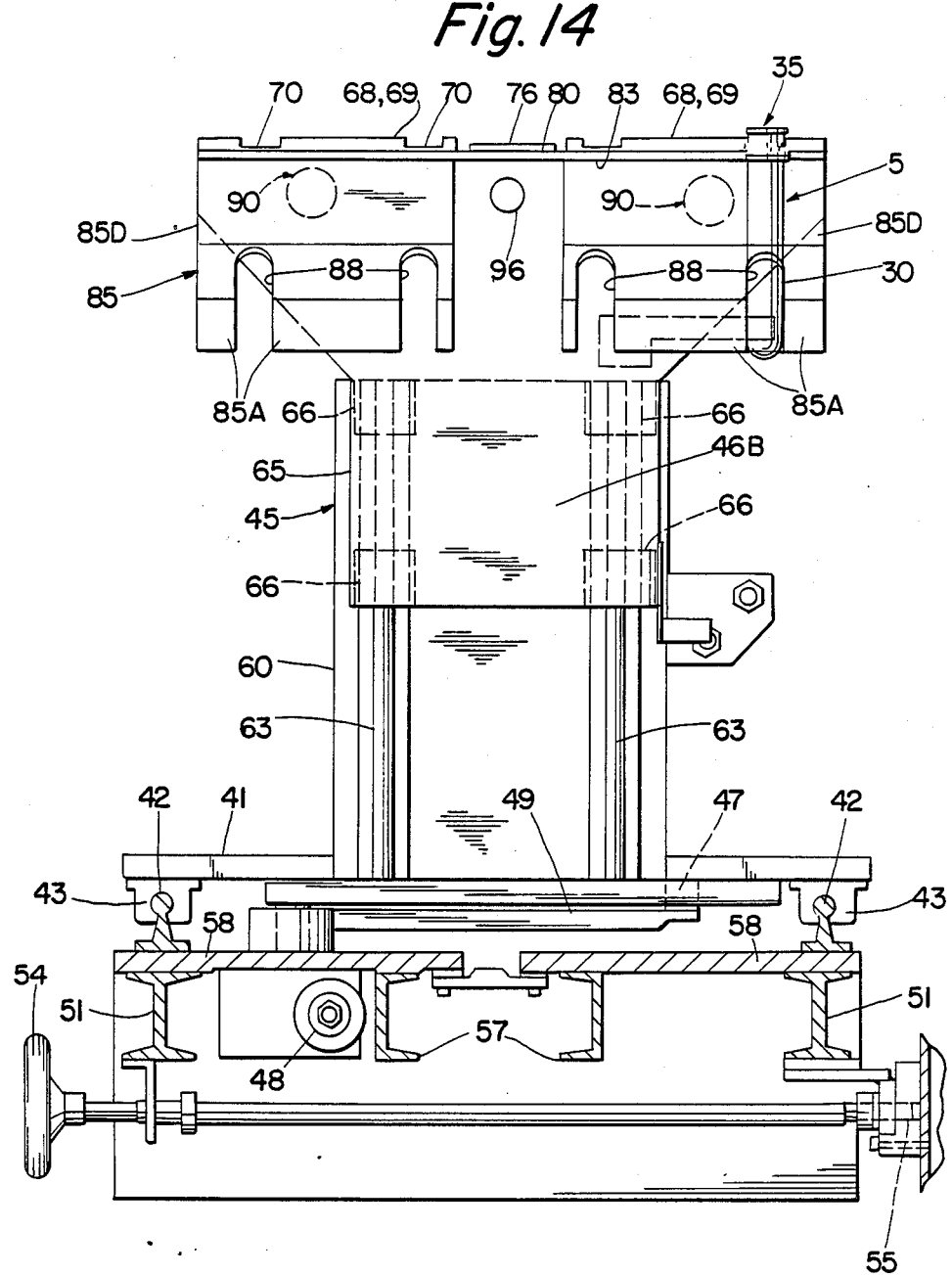
FIG. 14 is a rear elevation partial section view of the carriage assembly along 14—14 of FIG. 2 showing along with FIG. 13 the vertical carriage drive means and other features.

Frame 40 (see FIGS. 2, 14) is preferably an assembly rather than a solid piece of material and includes channel end pieces 50 and I-beam side sills 51 arranged in a rectangle with gussets 52 on the corners, a mounting hinge 53 securing one end of same to the base of the blow molding machine and a hand wheel 54 operated lock on the opposite base end to secure as by threads 55 to the blow molding machine. Center sill channels 57 and slats 58 provide central stiffness and a recess in which is secured cam 59 of the fail-safe system.

A vertical cylinder mounting plate 60 is secured at right angles to base 41 and reinforced in that position by gussets 62; these elements, bearings 42 and vertical guides 63 (secured to plate 60) are all included in the horizontal carriage assembly which in turn supports vertical carriage assembly 45.

Figure 5:
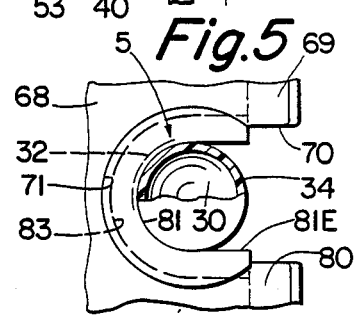
FIG. 5 is a top view on section 5—5 of FIG. 4 with rings 32 added for clarity.

Vertical carriage assembly 45 includes the vertical carriage base 65 on which are mounted linear ball bushing bearings 66 which are guided vertically by guides 63. An upper support ring plate 68 is fixedly secured to the uppermost end of base 65 and has a locating means 69 on the plate trailing edge consisting of the upwardly bent trailing portion (see FIGS. 3–6). Support ring notches 70 are cut in the upper plate trailing edge and, as seen from above (FIGS. 5, 14) are shaped like the Greek capital letter Omega ($\Omega$) to define, in the horseshoe or U-portion, a circular sector 71 recess just slightly larger in diameter than (about 0.030 inches to 0.050 inches preferably 0.040 inches) the diameter of preform support ring 33. The legs of the Omega ($\Omega$)—which terminate in locator or bent edge 69—are spaced apart sufficiently to allow the preform body 30 readily to pass between them (about 1/16 inch to $\frac{1}{8}$ inch more than the diameter of body 30 and in FIG. 6 designated distance 72).

A vertical power means that preferably is double acting air cylinder assembly (or more broadly, fluid cylinder) 75 is secured to cylinder plate 60 and its plunger of piston rod is drivingly connected to vertical carriage assembly 45, preferably as shown to base 65 by tab 76 (FIGS. 7, 8). Cylinder 75 reciprocates to push the vertical assembly 45 from the lower position at the oven (solid lines FIGS. 2, 8) up to the level of the aligns groove 35 with holder 20 (dotted FIG. 2, solid FIG. 7) for transfer at station 12 respectively.

Figure 10:
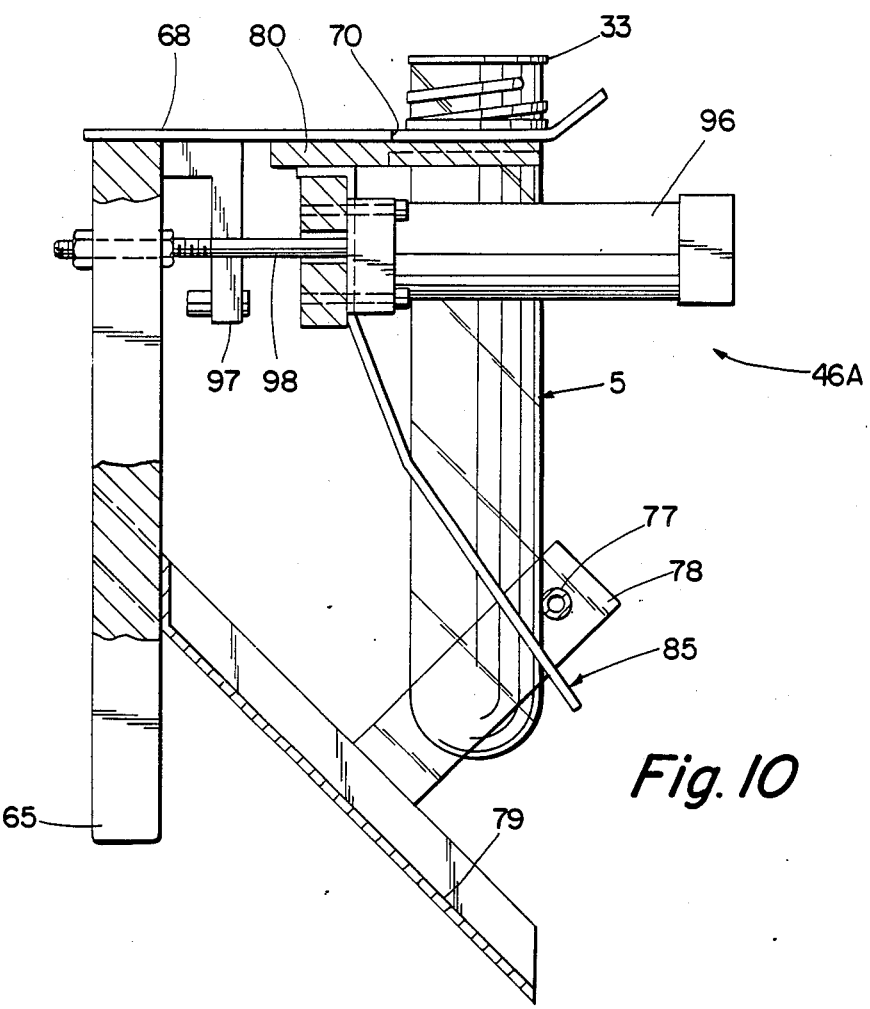
FIGS. 10 and 12 illustrate a preferred carriage assembly fail safe system, are respective side (on 10—10 of FIG. 12) and rear views.
Figure 12:
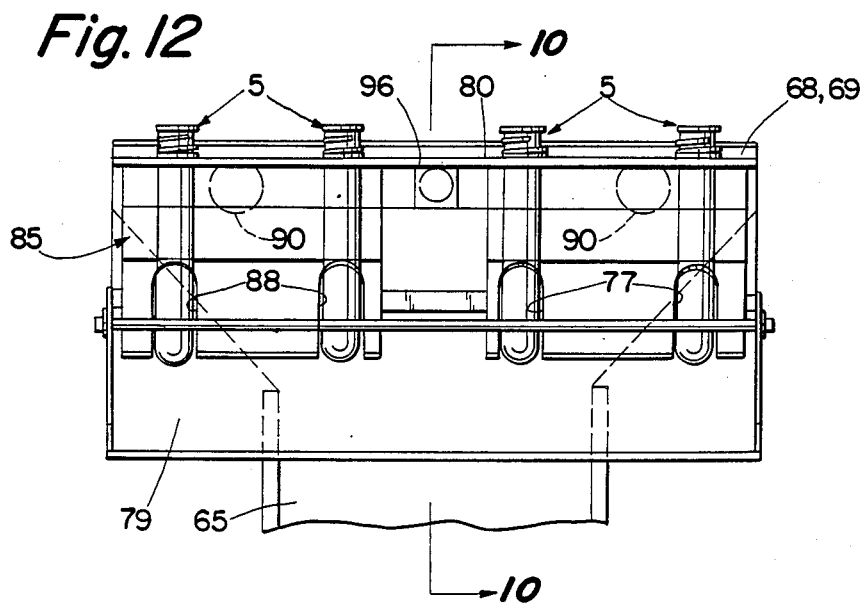

FIGS. 10,12 illustrate optional but preferred fly bar 77 held by and between brackets 78 which are secured to the edges of tray 79 that in turn is secured to vertical base 65. The tray guides any preforms accidentally hung up when they drop to a location (e.g. scrap bin underneath) not illustrated). Fly bar 77 keeps the preform lower end from swinging counterclockwise under inertia and may conveniently be made of tubing.

CARRIAGE FAIL SAFE MEANS (FIGS. 3–13)

FIGS. 1–14 show a power cylinder fail safe means 46A to assure removal of an accidentally retained preform in vertical assembly 45. It has a reciprocatable inner plate 80 (FIGS. 3-6) mounted immediately underneath and in sliding engagement with outer plate 69. This inner plate supports the preform by engaging the underside of support ring 32 and is withdrawn from underneath preform support ring 32 (best seen in FIGS. 9-11) to remove such support and is likewise withdrawn to assist in removing an accidentally retained workpiece. U-shaped notches 81 are in the trailing edge of plate 80 and preferably as depicted (FIGS. 5, 6) are shaped to include a semicircular end 81C with two parallel legs 81E (FIG. 6) each tangent to the ends of the semicircle. Semicircle 81C has a diameter about 0.005-0.020 inches larger than the diameter of the preform body at that point (e.g. FIG. 6). Notch 81 has as undercut or relief 83 to minimize the area 84 in contact with the preform body 30, hence to reduce conductive heat transfer away from such body. Guide plate 85 is fixed to movable plate 80 and preferably is bent out of sheet metal to have (FIG. 4) mounting flange 85F, vertical web 85D depending therefrom, and an apron 85A extending obliquely from the web to a location under notches 81. Apron 85A has notches 88 cut therein and shaped like the projection of notches 81 onto the slope or plane of apron 85A. Plate 85 holds preforms in the preferred exactly vertical posture and assures preforms ejected during fail safe fall away, among other features.

In the depicted (FIGS. 13, 14) presently preferred construction, two mirror image outer and inner plates 68, 80 are provided, one right hand and left version of each and spaced apart sufficiently to provide a central gap. Use of two short pieces of each facilitates manufacture of a flat part, although one long piece for each may be used. Flange 85F and web 85D of guide plate 85 extends all the way across on cross bar 89 and support thereon both inner left and right hand plates 80, thus obtaining movement as one when the actuating means operates and resets the inner plate(s) 80.

Figure 11:
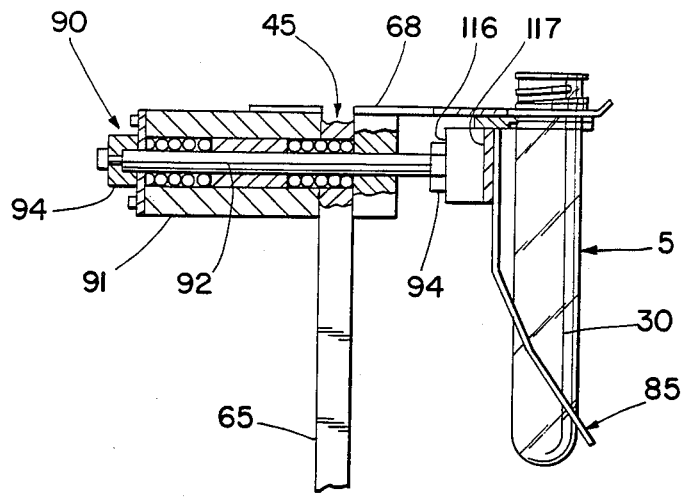
FIG. 11 is an offset section along 11—11 of FIG. 13.
Figure 13:
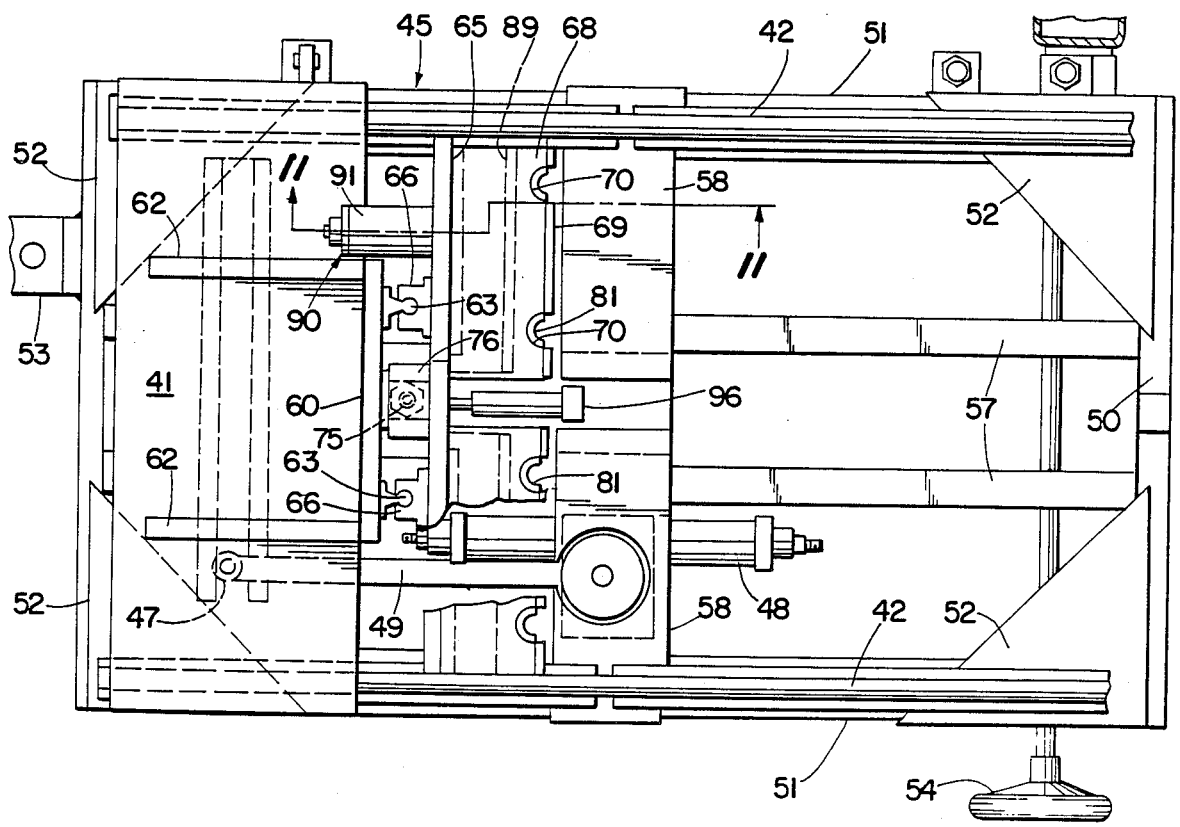
FIG. 13 is a partly cutaway top view of the carriage of FIGS. 2, 7-12 as seen on section 14—14 of FIG. 1.

Also, as best shown in FIGS. 10-12, the assembly of an inner plate(s) 80 and guide plate 85 is movably mounted on a pair of linear ball bearings 90, bearing cage 91 (FIG. 11) of which is secured to vertical plate 65 and the guide rod(s) 92 (FIG. 12) of which are secured to the 80, 85 plate assembly. A snubber or shock absorber in the form of a helical spring or, preferably, a resilient pad or washer 94 may be provided at each end of the guide rod between the retaining nut and the bearing end.

Abort cylinder 96, preferably a commercial compressed air cylinder, is mounted on or under plate 80 and its plunger 98 secured to vertical carriage plate 65 by L-shaped bracket 97. Admission of air in the left end of 96 moves or actuates cylinder 96 to reciprocate inner plate 80 from the normal or preform support FIG. 12 position to the fail safe eject position of FIGS. 11 and 13.

THE INDEXING DRIVE TRAIN (FIG. 1)

This is an assembly of commercially available items that functions to periodically index the conveyor system (chain 18 and holders) thereby to move a group of four preform holders successively into transfer station 12, to blow station 14, then to eject station 16, and then to step the group back around to repeat same—all in synchronism with the oven eject and reach and take functions. It includes mounted on frame 119 an electric motor 120 driving a clutch-brake 122 through a timing belt 123 wrapped about suitable toothed pulleys. A gear reducer 125 slows down rotary speed (10:1) and feeds its output into an index drive unit 127 which is commercially available from several USA sources such as Ferguson Machine Company, St. Louis, Mo. and/or CAMCO (Commercial Cam Division, Emerson Electric), Wheeling, Ill. Preferably a 90° dwell, 270° index per 360° input is used but this does depend on original motor 120 speed and overall speed reduction.

The indexing (i.e. periodical unidirectional arcuate motion) from 127 output goes through suitable shafting 129 to chain drive sprocket 25. Shafting 129 is preferably an assembly with a roller bearing supported shaft housed in a pillow block. Idler sprocket 26 (FIG. 2) is constructed and mounted similarly on assembly 131 at the other end of the conveyor preferably with a chain tensioning means 133. Assemblies 129, 131 and tensioner 133 are mounted on frame 119.

CONVEYOR SYSTEM 10 AND HOLDER OR NOSE ASSEMBLY 20 (FIGS. 1 THROUGH 9)

The Conveyor System 10 includes an endless conveyor member 18 (FIGS. 1,2) preferably a roller chain 22 (FIG. 10) which is wrapped in endless fashion about sprockets 25, 26 (FIG. 2) and thus, along with other parts of the system, is mounted directly or indirectly on frame 119. Note that mounting components on frames 40, 119, permits manufacture of them as articles of commerce and facilitates retrofitting RHB-V blow molding machines as well as use in other contexts in contrast to on-site assemblage.

Chain 22 is supported with its pins 23 on vertical axes and preferably is prestretched and is kept linear and in tension on the active side of its path so that workstations 12, 14, 16 may be along a straight line and the workpiece only has to travel linearly.

Roller chain construction is well known and is described in parent case U.S. Pat. No. 4,723,906 but for background and convenience the standard nomenclature of some FIG. 10 parts is now given (using terms from Marks' Mechanical Engineers Handbook, Fifth Ed., page 925 et seq.): a pair of pin link plates 140 connect adjacent pins 23 and are disposed on the outside of the chain; about each pin is a bushing (not illustrated herein) which preferably extends through a roller link plate 143 on the inside of the pin links 140; a roller 144 is about each bushing and spaces the pair of roller link plates 143.

Holder assembly 20 (FIG. 9) is attached to the chain by using an extra-long pair of pins 23x (extended pins) secured in the usual manner to an uppermost pin link 140 and which pass through the bushings and rollers to the lowermost special pin link 145 which is oversized (that is, has an integral lug as an attachment means which extends out from the chain as illustrated in FIGS. 2, and 7-9) through a low friction (e.g. nylon 101) carrier guide 146 and finally through the inboard end of rigid nose mounting base 148 where cap screws, rivets or other fasteners 149 secure all together. That is, extended pin 23x secures together the usual parts of a roller chain between a pair of pin link plates and additionally secures on the lower side carrier guide 146 and base 148. Cap screws 149 provide supplemental fastening of carrier guide 146 to lug 145 and base 148, respectively.

Holder per se 150 completes the above assembly 20. Holder 150 is preferably of a strong low friction material (e.g. nylon), of circular cross-section, and is built like the spindle nose of parent case U.S. Pat. No. 4,678,425 which is incorporated herein expressly. The structure as described in FIGS. 3–6 of said parent application U.S. Pat. No. 4,678,425 is preferred and used here in its entirety.

Holder per se or spindle nose 150 comprises in its preferred embodiment a one-piece or integral member molded, machined or otherwise formed from a single piece of plastic known as nylon 66. It is preferably circular in cross section and has a main body 151 from which protrudes on one side locating stud 152 which fits into and is shaped like a matching locating recess or hole through rigid base 148. Extending down from the opposite side, usually the bottom, of the nose base is skirt 153 or flexible annular mandrel which sealably connects to a preform. This skirt is made to have a slight interference fit with the ID of the preform finish and so that it can expand under the pressure of blowing air by an amount sufficient to maintain the seal with the preform finish 35, or more exactly to maintain a seal with the inside surface of the preform finish. The degree of interference is determined by several factors—friction to assembly, eject and resilience to name two. If the skirt does not have this resilience, whereby it can follow expansion under pressure of the preform finish and still maintain the seal, finish 35 may expand too much, create a gap with the skirt, whereupon the seal is lost, air leaks hence pressure drops, and the blowing becomes ineffectual or imperfect. This has happened where the nose has been too rigid instead of skirted. Efforts to correct this would require either excessive air pressure, volume, or both.

Spindle nose 150 in addition to having flexible skirt 153 has air passage 154 and sealing bulge 155 shaped thereon. Body 151 has tapped blind bolt holes 156 in it whereby bolts or cap screws 149 secure it to base 148. Preferably, as in FIG. 9C, a commercially available retaining ring 149X (e.g. Tru Arc) secures nose 150 to base 148 via snap groove 156X.

Thus, a spindle nose according to the invention is built like that in parent case Ser. No. 900,947 and may have a base with spindle orientation mounting and has a centrally located air passage 154 which connects between the spindle air passage 30 and the inside of the preform, a flexible skirt 153 which expands under blowing pressure sufficiently to maintain seal with the inside of the preform finish, is preferably of one-piece construction and even more preferably is made from a low friction material such as nylon 66. Furthermore, the expanding skirt has a sealing contour or bulge 155, the better to achieve a seal with the preform. The skirt preferably has a relief or undercut 157 where the skirt connects or cirst protrudes from surface 158 of body 151.

An example of skirt dimensions providing suitable fexibility is found in those for a spindle nose to be used for handling a preform and the resulting product with a 77 mm. finish (e.g. for peanut butter). The inside diameter of the skirt at its bottom end is 2.750, the outside diameter of the skirt above the sealing ring must be from 2.818 to 2.822 inches, the maximum OD of the sealing ring must be from 2.830 to 2.834 inches and the depth of the skirt is about 0.66 inches from the preform face of the base to the bottom of the skirt.

Relief 157 is an undercut machined or otherwise formed all the way around the skirt where it joins the base. This relief enhances flexibility and also makes it easier to separate the workpiece from the spindle nose after blowing. This relief is approximately 0.12 inches along the axis and about 0.010 inches deep.

Preform 5 is moved in a path where the flat bottom 158 of the nose 150 clears the top of the stop on top of the blow mold by about 0.005–0.010 inches. This clearance is eliminated during blowing by the stuffer nose flexing the entire system to force bottom 158 down on the blow mold stop.

Figure 19A:
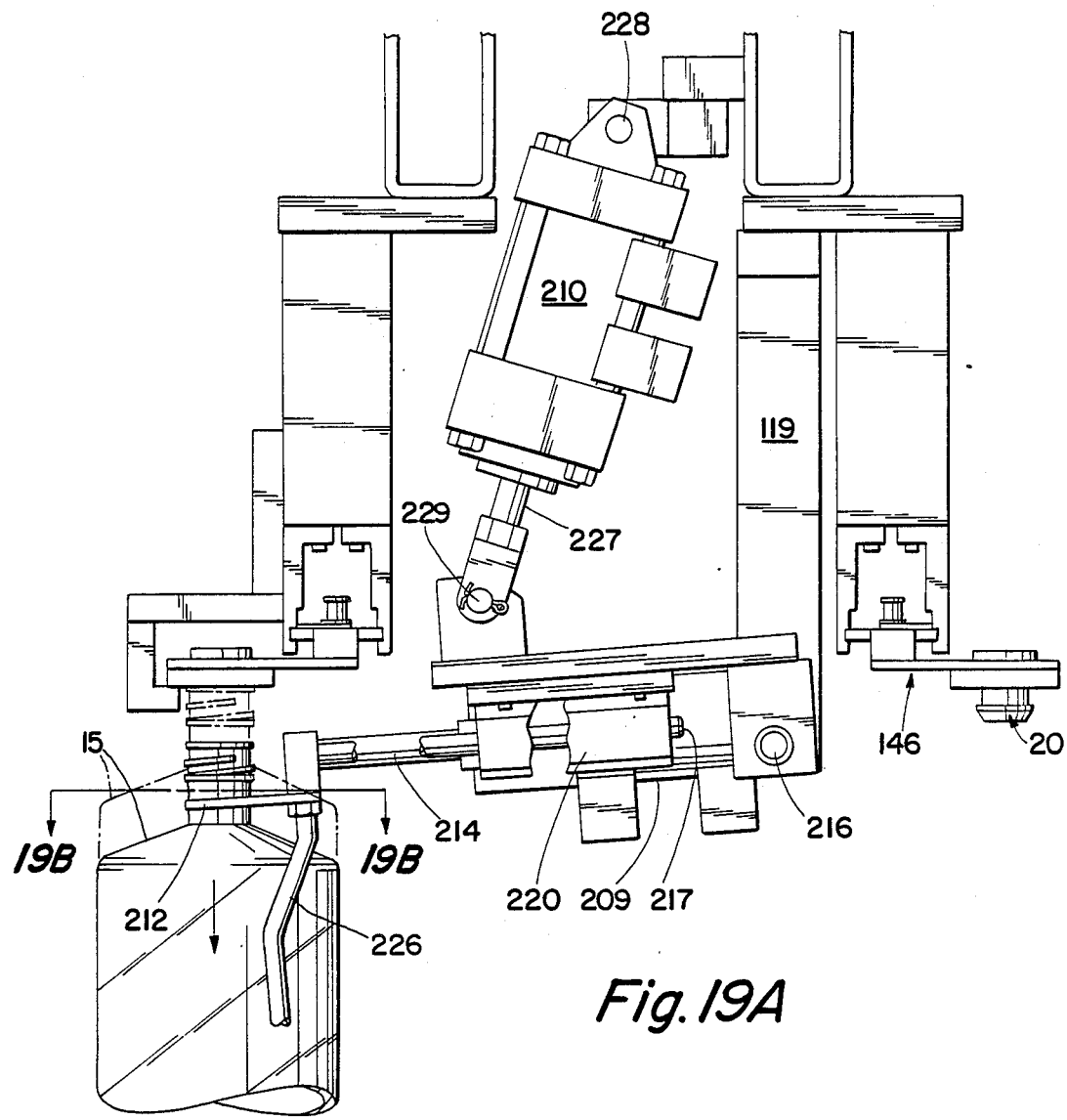
Figure 19B:
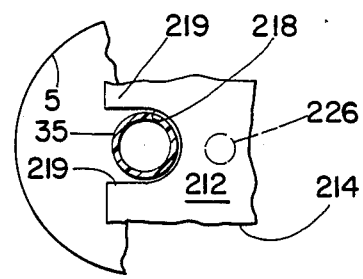

Carrier guide 146 is molded of low friction plastic material preferably nylon 101 and has a main body part 147 (through which pins 23x pass) of the correct thickness to provide alignment (especially vertically) at the work station. On opposite sides of the body 146 are linear bearings 162 which have a leader taper 164 on the leading and trailing corners. Bearings 162 slide in grooves 166 in rails 168. Chain support means here include a pair of rails 168 secured to frame 119 (FIGS. 9A, 17, 19) with the chain 22 supported in between by bearings 162 engagement with groove 166. The rails are disposed (FIGS. 1, 20) along the straight runs of the chain, especially on the line past the workstations 12, 14, 16 and on the return run.

Preferably the sprockets are of equal size and the side of the chain in tension runs past the work stations 12, 14, 16 which latter are spaced outward from the chain sufficiently to align correctly with preforms on the noses. The noses in turn are arranged in groups (shown as four) corresponding to the number of blow molds and spaced within the group the same as such molds. The groups, rather corresponding holders in successive groups are spaced the amount the chain moves on each iteration, which is usually greater than the spacing between holders in a group.

Vertical stop 172 is located at load station directly above the place where holder assembly 20 has stopped to receive preform 5 on spindle 150 as a result of vertical movement of the latter, as explained elsewhere herein. Preferably stop 172 is a single piece of material with a smooth bottom that extends across all of the individual preform load points at station 12. A sensor 170 can be positioned at each individual load point to determine if each holder receives a preform or other such information.

STUFFER 27 (FIGS. 1, 15, 16)

In blow molding of plastic bottles, stuffer is the common term for a device to connect a preform to a source of clean, dry compressed gas—normally compressed air—for blowing. The prior art for an RHB-V used a yoke to raise and lower all the stuffers at once and inserted a male element into the finish 35. The present invention employs a vertically driven face seal to seal against finish 35 by vertical force and allows a small independent movement of each stuffer 27 for each preform with a novel telescoping relation between stuffer rod (and nose mounted on it) and the center rod 28 where the latter, as an option, is provided. Semicircular molds stop blocks 177 ae secured to the top of the respective mold halves to surround the place where a preform depends into the mold cavity. These engage the spindle nose base 151, which is a flange. During blowing a face seal is established with stud 152 when the aforesaid bearing relation is established. This no load condition is important to allow use of lighter weight, thinner, finishes and overall bottle structure.

As shown in FIG. 1, the stuffer assembly 16 is mounted at the blow molding station on a frame having an upper cross piece 180 on which is mounted the center rod cylinder and a lower cross piece 182 secured to their frame 119 and on which are supported the stuffer cylinders 185. All of these are vertically aligned to be substantially coaxial with the blow mold 188 associated with each stuffer and center rod unit.

Both the center rod cylinder 190 and stuffer cylinder assembly 27 are double acting and preferably are pneumatic rather than hydraulic in order to keep air above the molds and parts handling the preform. Use of air above, as is well known in the art, reduces or eliminates problems associated with hydraulic oil systems such as leaks, contamination of the product, misting, etc.

Stuffer cylinder assembly 27 has a hollow double ended plunger 29 mounted on the piston 192, each end of plunger 29 protruding from its respective end of the cylinder past an air seal 194. This plunger is hollow, having a bore 196 that is big enough to permit the center rod 28 to pass completely therethrough and to operate in telescoping relation. On the bottom end of the stuffer assembly is a stuffer nose 198 having a longitudinal bore 200 coaxial with and substantially the same size as the bore 196 through the plunger. Seal 202 is at the upper end of nose bore 200 to prevent leakage of compressed air past the center rod. Air as seen in FIGS. 15, 16 is brought from a source through a passage 204 in the wall of the stuffer nose into nose bore 154.

At the lowermost end of nose 198 is face sealing surface 206 which establishes a face seal with the top of stud 152. Enough pressure is applied to the upper cylinder to maintain this face seal against the pressure of blow air passing into the hollow part of the preform from the stuffer nose bore.

When the system is in a blowing mode with air entering through the stuffer nose bore, there is enough freedom of motion allowed by overall structure of chain 22 and nose or holder assembly 20 to permit seating or bearing by support ring formed by the main body part of the nose against stop 177 bolted or fastened to the top of the blow mold. Preferably semi-circular bearing block 177 secured to the top of each blow mold half and moves underneath the nose main body for the blowing operation.

EJECTOR 16 (FIGS. 17, 18, 19)

The ejector station 16 is where a pair of double acting air cylinders Ser. No. 209,210 push the now blown bottles vertically down and off the nose spindle from whence they fall away. The cylinders may also be single action so long as each is biased to the fail safe, home, and starting position of FIG. 17 thereby to avoid interference and damage to itself, other machine parts, and/or product.

Ejector air cylinder 209 has pusher bar 212 on the end of plunger 214. Pusher bar 212 extends parallel to the roller chain 22 and is long enough to contact all of the now-blown bottles 15 at once during the ejection step. The pusher bar being so long, one or more guide rods 217 are attached to it and fit in a linear bearing 220 all supported on platform 228 which has a journal 216 to allow all to swing relative to from frame 119.

The roller chain conveyor brings a group of preforms to the eject station, each opposite or aligned with a corresponding notch 218 (FIG. 19B) which provides a stripper finger 219 on each side of the notch. The notch is shaped and sized to loosely receive a lower part of the finish of the blown product. The stripper finders are spaced so that when pushed down to eject they engage the larger and upper part of the product as shown in, e.g., FIGS. 19A, 19B.

A pair of vertical guide rods 226 are supported (FIG. 19A) from pushbar 212 adjacent each product, less than one product diameter apart to guide the ejected product along a substantially vertical path once it is free of the nose.

Figure 17:
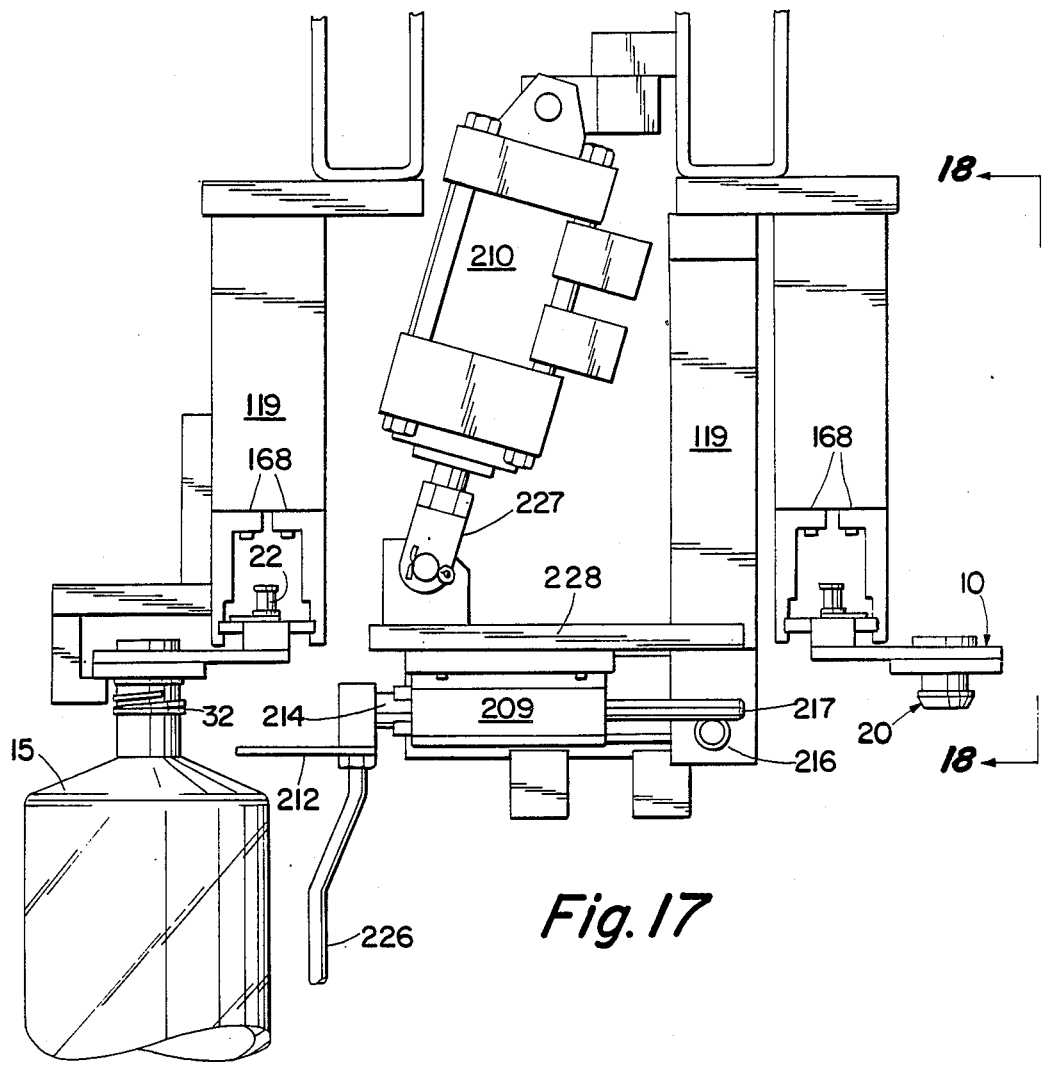
FIGS. 17, 19A and 19B show the ejector workstation along 17—17 of FIG. 1 before and during ejection from the holder wherein 19B is a top view of pushbar fingers and a bottle on section 19B—19B of 19A.
Figure 18:
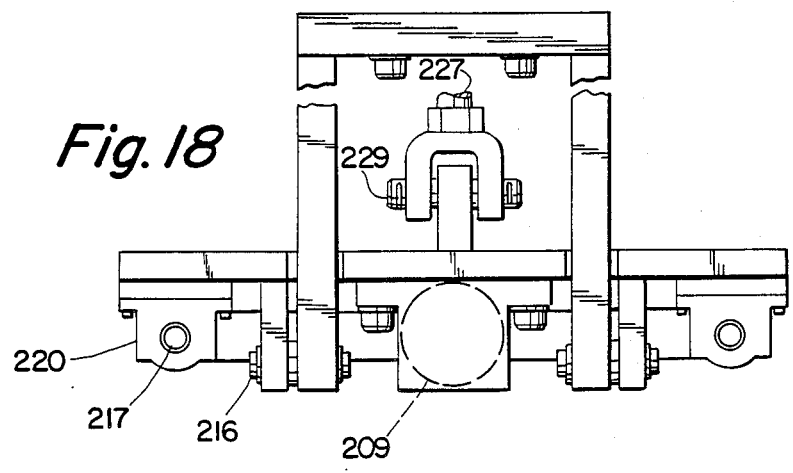
FIG. 18 is a view along 18—18 of FIG. 17 omitting the empty right hand array of nose assemblies of the conveyor system.

In operation, a group of blown product is stopped in the FIG. 17 position so that the finish of each is opposite a corresponding notch 218. Then cylinder 209 is actuated to extend its plunger and move the pushbar so that fingers 219 are disposed about the finish above the enlarged body as in FIG. 19A dotted lines. Then stripper cylinder 210 is actuated to extend its rod 227 to depress fingers 218 sufficiently to push or force the bottle off the mandrel, arriving at the solid line position of FIG. 19A. During this exercise, one end of cylinder 210 pivots about journal 228, which is also its support from the machine frame. Rod 227 pivotably connects to the platform 228 (which supports cylinder 209, guide rods 217 so they all rotate together about journal 216) by clevis 229. This allows pivoting at each end of cylinder 210 during the operations of extending the pushbar, ejecting, and returning to the starting or home position.

REVIEW OF MACHINE OPERATION

As mentioned in the section subtitled "General Description", the purpose of this invention is to receive the preform in the carriage assembly 9 at oven 7, place it in the conveyor assembly 10 at transfer station 12 and then to move it through a blow molding operation at 14 and the eject station 16 where it leaves the machine as a finished product. Operation is understood by following a workpiece (initially a preform) through the machine referring to key machine elements now identified. Understand that preferably a plurality of workpieces, starting as preforms 5, usually four, are processed through the machine simultaneously.

The oven 7 indexes and stops with a preform hanging vertically ready to be discharged. At this point in time the carriage assembly 9 moves the notches 70, 81 vertically underneath the workpiece or preform. The oven assembly by means well known (e.g. the aforesaid patents) discharges the preform vertically down and into the notch where it is received and self-center bys reason of the relative size of notches 70, 81 and the bent trailing edge 69. The rotary actuator 48 now begins to swing its arm 180° to drive the carriage assembly and the preforms therein to transfer station 12. Differing from the parent case Ser. No. 869,499, the vertical carriage remains compressed at the low position shown in solid lines in FIG. 2 until it has moved the preform directly underneath and preferably coaxial with nose 150, i.e. to the FIG. 2 ghost position. Then the vertical carriage is moved straight up to the FIG. 7 position and drives the preform finish upon the nose preferably to where the end of the finish 32 stops against the shoulder 158, the undersurface of spindle body 151. The preform is now lodged on the conveyor assembly whereupon vertical carriage 45 is pulled vertically down to the FIG. 8 position so that the conveyor can move the preform(s) away (normal to the plane of FIG. 8) and the carriage assembly be moved to the left for the next cycle.

To do this, vertical carriage cylinder 75 operates again to retract, i.e. to pull carriage notches 154–156 down to the FIG. 8 lowermost position thus clearing away from depending portions of the preform and eliminating the probability of catching a preform in the carriage notches—or more correctly in plates 68, 80 or vertical plate 60 when the conveyor actuates to transfer preforms from station 12 to the next workstation. With the carriage pulled down to the FIG. 8 compressed position, the rotary actuator operates in the opposite direction to return the carriage assembly to the oven discharge for a repeat of the above events. This operation preferably takes place concurrently with operation of the conveyor assembly to transfer the workpiece through the work stations. However, during the return of the carriage to the oven discharge, the fail safe 46A of system 46A of FIGS. 10-12 is actuated to insure clearing away any accidentally retained workpieces.

In FIGS. 10-12 fail safe air cylinder 96 is actuated manually or in response to limit switch or sensor valve actuation to directly move the inner plate 80 back and forth to move the support 81, 83 from underneath any retained preforms and then to reset the same.

The respective fail safe functions are completed by the time the carriage assembly is returned to the position of FIG. 2 where it is again ready to receive the next (batch of) preform(s) delivered from oven 7.

In the meantime, conveyor assembly 10 is actuated by the indexing drive system 120-127 of FIG. 1 to move the group of preforms just received at work station 12 to blow molding station 14, stopping in a correct and substantially coaxial alignment with the center line of the stuffer assembly and center rods 27.28 located at that station. When this operation takes place, each preform 5 that has been located at blow station 14 has been converted to a bottle 15 (if the blow molding operation were successful) and the group is moved to the eject station 16. In the meantime, the following group of preform holders 20 is moved into position at transfer station 12 sliding on supports 162 and preforms guided means 170 where the above operations coordinating with the carriage assembly can be repeated at the correct time and the holder groups ahead of the eject station move on around one interval each.

Once the preform 5 is located at blow station 14, the blow mold(s) 188 is/are closed, the stuffer assembly 27 operates and stuffer nose 198 engages the preform to create the face seal described in more detail with reference to FIGS. 15, 16 and the system is now ready to blow mold a bottle by introducing air through the stuffer nose bore 200. If center rods 18 are provided (this is an option not all machines have), the center rod cylinders 190 are actuated by providing compressed air to drive center rods 28 down sufficiently fast to follow the preform to the bottom of the blow mold in a manner known in the art.

When the blow molding operation is completed the center rods 28 are retracted upwardly into the nose and the nose is, of course, retracted to eliminate the face seal and release compressed air within the now blown bottle 15, returning to the positions approximately illustrated in FIGS. 1, 15.

While the blow molding operation is taking place at station 14, an eject operation is taking place at station 16 by applying compressed air to the rear end of the cylinder causing it to move the push bar out against the workpiece—now a bottle finish—and the movable depending guides 226 against the body of bottle 15. This moves pushbar fingers about the finish as in FIG. 19 whereupon stripper air cylinder 210 is actuated to extend its plunger thus to push the fingers down and push the bottle down and off the nose. The bottle then begins to fall away against guides 226. Ejector cylinders 209,210 then reset to the FIG. 17 position.

The sequence of operations may be achieved by manually operating valves to admit compressed air to the cylinders in time with manually switched (electrical switch) operation of indexing motor 120. Preferably, although not my invention, the timing is done automatically to get the above sequence using devices such as sensors, timers, cam operated switches to turn on power, admit and release air, perform diagnoses to determine if proper to go to the next step and so forth.

Operation of a system as above on an RHB-V machine successfully blew four two liter bottles about every 2.3 seconds, the so-called cycle time. When dry cycling (i.e. no preforms or blowing) the machine can be speeded up to about 2.1 seconds cycle time. Cycle time when blowing is limited by the blowing and cooling time at the blow station.

Once the blow molding and eject functions have taken place (and they are both done at the same time on different groups), the blow molds are opened and the system is now ready to be indexed once more to repeat the foregoing.

What is claimed is:

1. Apparatus for blow molding hollow preforms, the apparatus including a combination of a conveyor for conveying hollow preforms having a finish on an open end internally engaged to the conveyor, the preforms being conveyed from a preform transfer station through a blow station spaced apart in the direction of movement where the preforms are received in blow molds and converted to expanded hollow products therein, and then to an eject station where such products are ejected, the apparatus comprising:

a pair of roller chain sprockets, one being a drive sprocket, disposed on vertical shaft axes;

a roller chain disposed in a horizontal plane with its pins vertical and about said sprockets;

a plurality of groups of preform holder assemblies supported in succession on said chain, the preform holder assemblies in each group being spaced the same as the blow molds are spaced so the preforms thereon may be presented aligned with respective blow molds, each preform holder assembly having a rigid cantilever support member with an inner end and an outer end and supported at its inner end from the bottom of said chain from the pin link plate thereof, with the outer end extending outboard of the chain pitch line; and a holder means attached to the said cantilever member outer end and extending generally horizontally therefrom and comprising a spindle nose depending from said cantilever member for engaging the inside of the finish on the open end of the preform, said spindle nose having a base having a top side and a bottom side;

a flexible annular skirt extending from the bottom side of said base, said skirt being sufficiently resilient to maintain sealing engagement with the inside diameter of the preform finish during blow molding; said base and skirt being of material which presents a low friction surface at those places where the nose connects to said preforms; and an air passage that extends completely through said base and skirt region; and an intermittent drive means to rotate one of the sprockets periodically an amount sufficient to move the chain an amount to remove an entire group of holder assemblies with products from said blow molds to the eject station and to replace same with the next succeeding group of holders.

2. The apparatus according to claim 1 further comprising:

each said spindle nose when at said blow station being disposed to support and internally engage the finish of a preform when a preform is disposed on the skirt and having a portion of the base extending sufficiently beyond the exterior of the finish to engage a stop member atop its corresponding blow mold, each said blow mold having a stop member to engage such base.

3. The apparatus according to claim 1 further comprising:

a chain support means for providing vertical and horizontal chain alignment along the straight runs of the chain; and a preform holder guide means that engages said support means and is secured to said chain as part of said holder assembly.

4. The apparatus according to claim 1 further comprising:

a chain support means having first and second pairs of rail carrier guides each pair disposed opposing the other with one of said chain straight runs in between a carrier guide track on each of said guides and likewise disposed; and said chain having a plurality of carrier guides disposed therealong with each extending inboard or outboard of the chain enough to engage its respective carrier guide track.

5. The apparatus according to claim 1 wherein said transfer station has a vertical stop member supported above the location where said spindle nose is stopped to receive a preform.

6. The apparatus according to claim 1 wherein said eject station comprises:

first and second respective reciprocating power means each pivoted at one end from the machine frame;

a pushbar with finger means to engage the blown product at the vicinity of the junction of the finish and enlarge blown portion, said bar being mounted for reciprocation by said first reciprocating means between a product engaging position by said fingers and a product non-engaging position by said fingers; and said second reciprocating means being connected to said first such means to raise and lower said fingers for ejecting the product by stripping the product vertically down when said fingers are engaged by a distance sufficient to remove the finish from engagement with said spindle nose.

7. The apparatus according to claim 4 wherein each holder assembly further comprises:

a lug extending horizontally from a selected bottom pin link plate said rigid cantilever member being fastened at its inner end underneath and to said carrier guide and by a distance to clear said chain carrier guides; and a carrier guide of low friction material fastened to the lug and that has opposed linear bearings extending into sliding engagement with one of said guide tracks;

said preform holder supported as aforesaid on the outer end of said cantilever member.

8. A reheat blow molding machine to move a heated preform of circular section from an oven to a blow mold where it is blown into a hollow product using a stuffer assembly and to convey such product to an eject station; wherein the preform has an unblown finish that is not blown but has an enlarged part on its finish from which depends a hollow tubular body to be blown to form the product that has an enlarged shape below the finish, comprising:

an oven section which discharges downwardly a preform heated preparatory to being blown;

a blow section for blow molding the preform into a hollow product and ejecting such product from the machine;

a preform transfer station, a blow mold station, a blow mold at said blow station, and a product eject station disposed linearly along one side of said blow section.

a reach and take carriage means for receiving the preform downwardly discharged from the oven, supporting it by its enlarged part, and moving same to said preform transfer station;

an endless conveyor means in a generally horizontal plane with a straight run extending along said blow section one side;

a plurality of outward facing preform holder means at a predetermined interval from each other along said conveyor means such that a holder means is at each of said stations at the same time;

each said holder means having a rigid cantilever member supported from said chain, a preform holder that includes a spindle nose supported and depending from the free end of said cantilever;

said carriage means having an upper plate, a finish or ring notch in said plate for locating the preform by its finish enlarged part ring, an inner plate movably supported underneath said upper plate, a body notch in said inner plate sized smaller than said finish ring notch and to receive a preform body, said finish ring notch and body notch defining a recess with a support surface surrounding said body notch the open side of the notches facing in the same direction as and aligned with said preform holder notch, said carriage means presenting said plates at a location beneath said transfer station at an elevation such that said preform can be moved vertically into engagement upon said spindle nose; and drive means to move said carriage means from said oven station to said location so that a preform is substantially vertically aligned with the spindle nose at said load station; and said spindle nose further comprising:

a base; a locating stud extending from one side of said base to within a matching recess in said cantilever member; a flexible annular skirt extending from the other said of said base, said skirt being sufficiently resilient to maintain sealing engagement with the inside diameter of the preform finish during blow molding; and an air passage extending completely through said locating stud, base, and flexible skirt region.

* * * * *